United States Patent [19]

Weng

[11] Patent Number: 5,868,313
[45] Date of Patent: Feb. 9, 1999

[54] AIR OUTLET CONTROL DEVICE

[75] Inventor: Kuo-Liang Weng, Taichung, Taiwan

[73] Assignee: Yiue Feng Enterprise Co., Ltd., Taichung Hsien, Taiwan

[21] Appl. No.: 27,541

[22] Filed: Feb. 23, 1998

[51] Int. Cl.[6] ........................................... F24F 7/00
[52] U.S. Cl. ............................... 236/49.3; 454/302
[58] Field of Search .................... 454/258, 302, 454/303, 256; 236/49.3

[56] References Cited

U.S. PATENT DOCUMENTS

| | | | |
|---|---|---|---|
| 4,931,626 | 6/1990 | Shikama et al. | 219/540 |
| 5,547,018 | 8/1996 | Takahashi et al. | 165/267 |
| 5,724,826 | 3/1998 | Han | 62/183 |
| 5,743,465 | 4/1998 | Jeong | 236/51 |

*Primary Examiner*—Harold Joyce
*Assistant Examiner*—Derek S. Boles
*Attorney, Agent, or Firm*—Peterson, Wicks, Nemer & Kamrath, P.A.

[57] ABSTRACT

An air outlet control device has a fan motor, a setting unit, a detecting unit, an air outlet, a box disposed on the air outlet, a plurality of sleeves disposed on the box, a vent ring disposed on the box, a plurality of bars disposed in the vent ring to position a cylinder seat, a screw rod inserted in the cylinder seat, a main motor connected to the screw rod, a control unit disposed on the main motor, a fastener inserted in a distal end of the screw rod, a guide plate covering the box, and a plurality of positioning pins disposed on the guide plate and inserted in the sleeves.

4 Claims, 8 Drawing Sheets

5,868,313

AIR OUTLET CONTROL DEVICE

BACKGROUND OF THE INVENTION

The present invention relates to an air outlet control device. More particularly, the present invention relates to an air outlet control device which can control a cross-sectional area of an air outlet.

A conventional cross-sectional area of an air outlet cannot be varied at all. When the temperature of a room is decreased to a predetermined degree, the amount of windage will be decreased in order to maintain the temperature of the room in a certain range. However, the cross-sectional area of an air outlet remains the same. Therefore, the flowing speed of the wind is decreased. Thus the amount of windage cannot reach the whole room so that the air condition of the room is not even.

SUMMARY OF THE INVENTION

An object of the present invention is to provide an air outlet control device which can control a cross-sectional area of an air outlet in order to maintain an air condition of a room evenly.

Accordingly, an air outlet control device comprises a setting unit, a detecting unit, an air outlet, and a control unit. The setting unit determines a set temperature value, a set humidity value and a set carbon dioxide value. The detecting unit has a plurality of sensors to detect a sensed temperature value, a sensed humidity value and a sensed carbon dioxide value. The control unit receives the set values from the setting unit and the sensed values from the detecting unit to compare the sensed values with the set values and to send a control signal to control a cross-sectional area of the air outlet.

In accordance with a first embodiment of the present invention, an air outlet control device comprises a fan motor, a setting unit, a detecting unit, an air outlet, a box disposed on the air outlet, a plurality of sleeves disposed on the box, a vent ring disposed on the box, a plurality of bars disposed in the vent ring to position a cylinder seat, a screw rod inserted in the cylinder seat, a main motor disposed on a guide plate and connected to the screw rod, a control unit disposed on the main motor, a fastener inserted in a distal end of the screw rod, the guide plate covering the box, and a plurality of positioning pins disposed on the guide plate and inserted in the sleeves.

In accordance with a second embodiment of the present invention, an air outlet control device comprises a box disposed on an air outlet, a plurality of sleeves disposed on the box, a vent ring disposed on the box, a plurality of bars disposed in the vent ring to position a main motor, a screw rod connected to the main motor, a cylinder seat disposed on a guide plate, a control unit disposed on the vent ring, a wire connected to the control unit and the main motor, the screw rod inserted in the cylinder seat, and a plurality of positioning pins disposed on the guide plate and inserted in the sleeves.

In accordance with a third embodiment of the present invention, an air outlet control device comprises a box disposed on an air outlet, a main motor disposed in the box, a screw rod connected to the main motor, a cylinder seat disposed on a guide plate, a control unit disposed in the box, a wire connected to the control unit and the main motor, and the screw rod inserted in the cylinder seat.

In accordance with a fourth embodiment of the present invention, an air outlet control device comprises an air outlet, a main motor and a control unit disposed in the air outlet, a shaft connected to a block plate and the main motor.

DETAILED DESCRIPTION OF THE INVENTION

Figure 1:
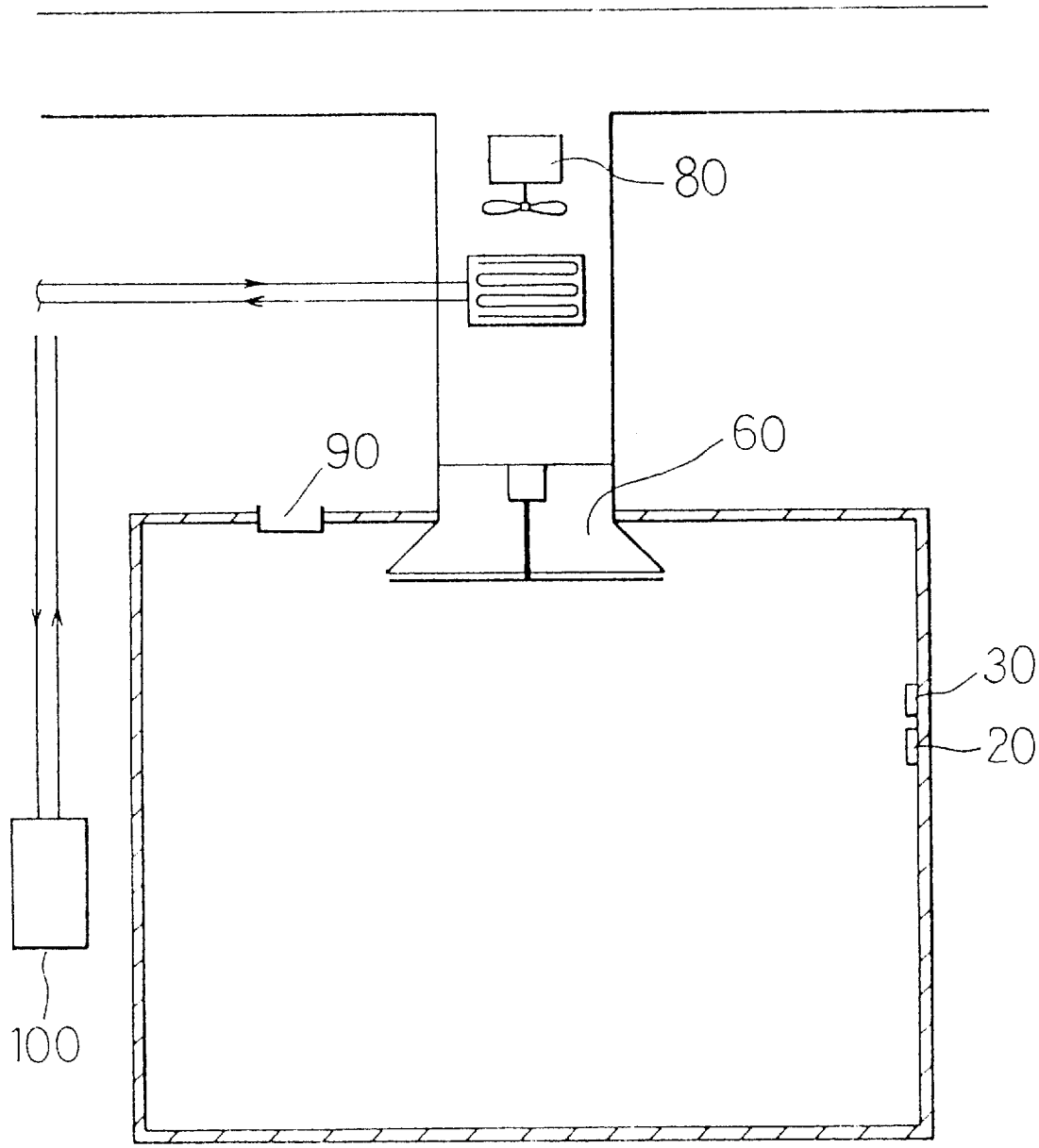
FIG. 1 is a schematic view illustrating an air condition system of a first preferred embodiment in accordance with the present invention.
Figure 2:
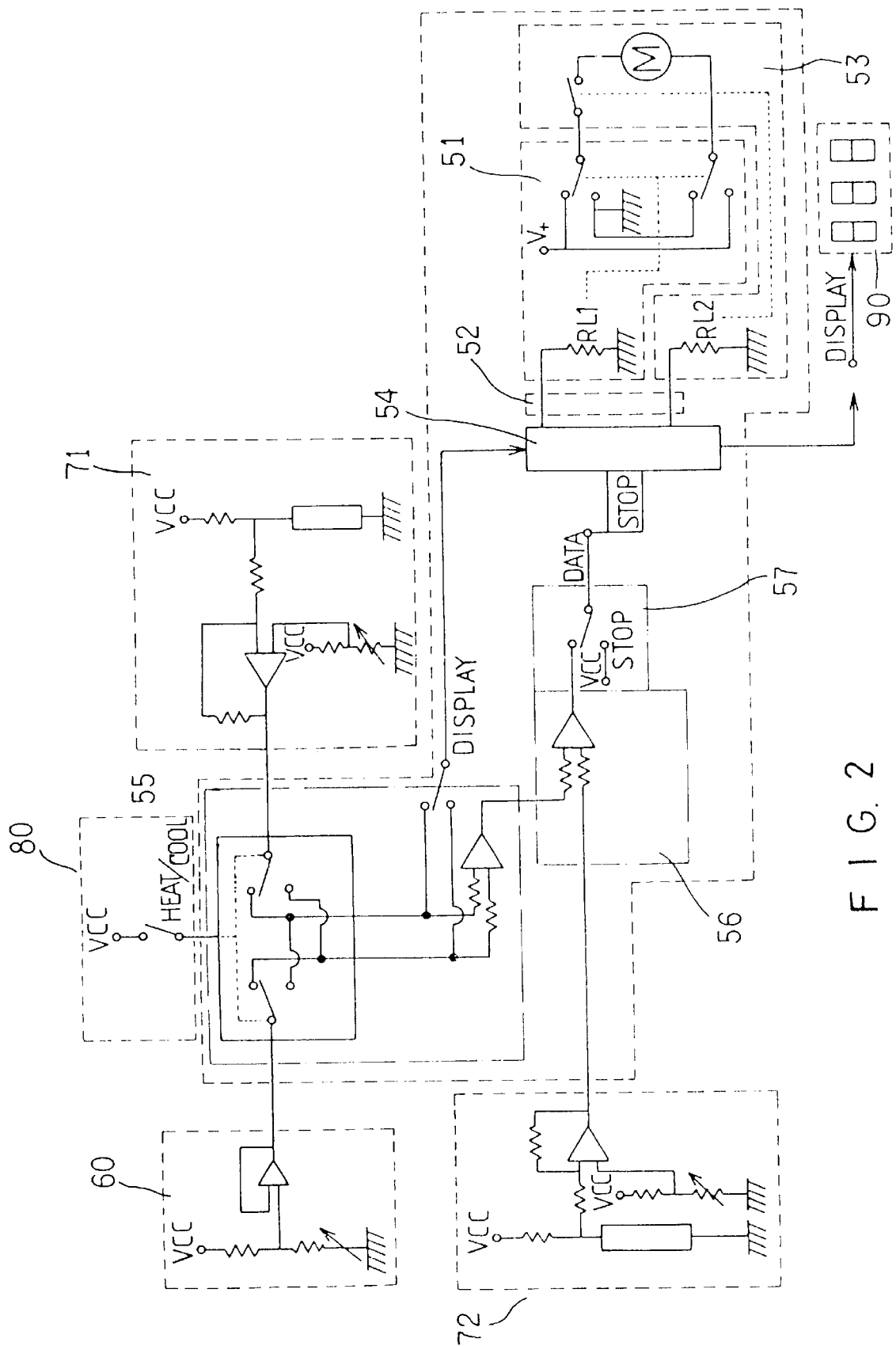
FIG. 2 is a block diagram illustrating an operation of a first preferred embodiment in accordance with the present invention.
Figure 3:
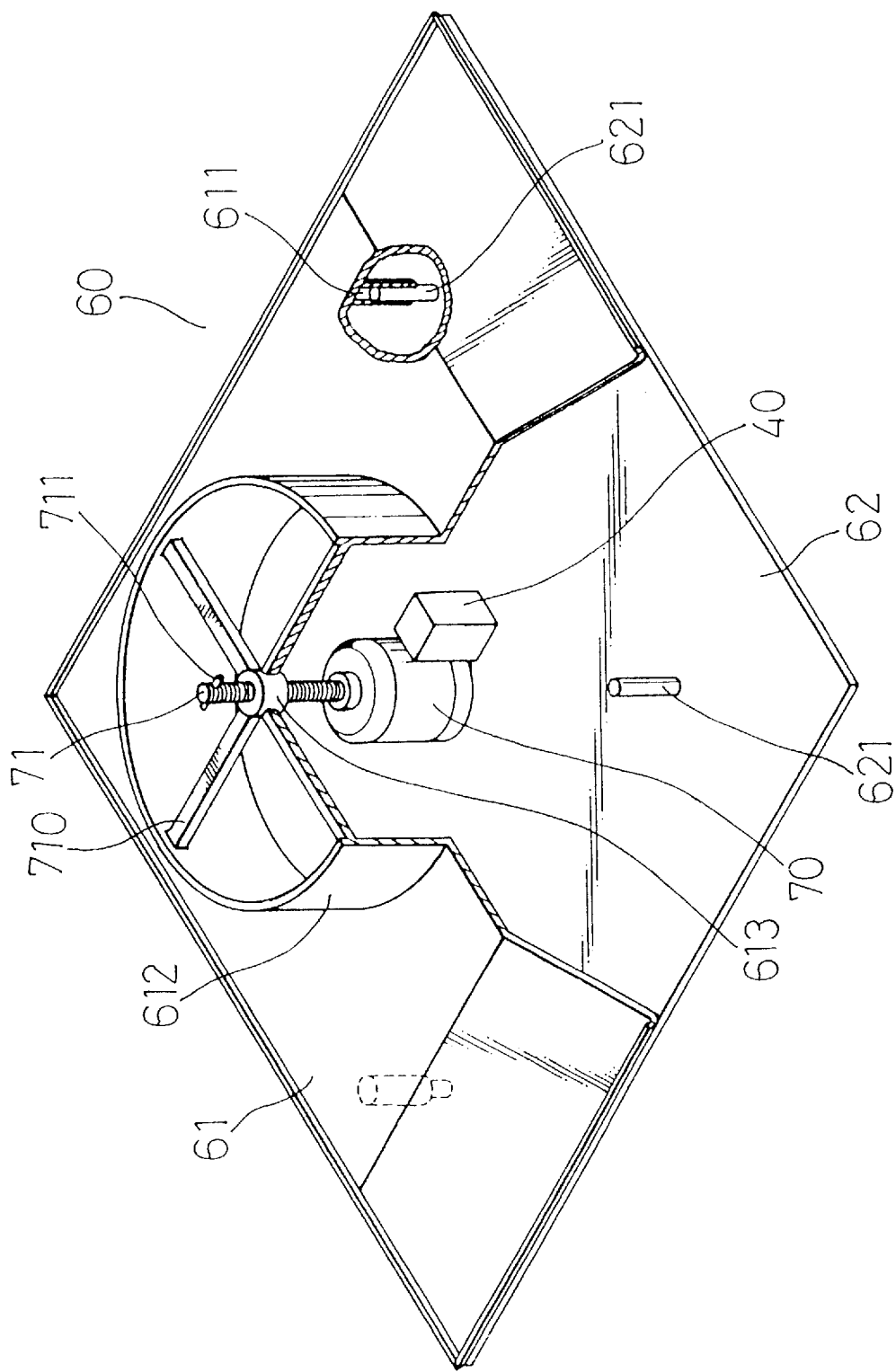
FIG. 3 is a perspective view of an air outlet control device of a first preferred embodiment in accordance with the present invention.

Referring to FIGS. 1 to 4, a first air condition system comprises a first air outlet control device and an ice machine 100. A vent hole 90 is formed in a room. The first air outlet control device comprises a fan motor 80, a setting unit 20, a detecting unit 30, an air outlet 60, a box 61 disposed on the air outlet 60, a plurality of sleeves 611 disposed on the box 61, a vent ring 612 disposed on the box 61, a plurality of bars 710 disposed in the vent ring 612 to position a cylinder seat 613, a screw rod 71 inserted in the cylinder seat 613, a main motor 70 disposed on a guide plate 62 and connected to the screw rod 71, a control unit 40 disposed on the main motor 70, a fastener 711 inserted in a distal end of the screw rod 71, the guide plate 62 covering the box 61, and a plurality of positioning pins 621 disposed on the guide plate 62 and inserted in the sleeves 611.

The setting unit 20 determines a set temperature value, a set humidity value and a set carbon dioxide value. The detecting unit 30 has a plurality of sensors to detect a sensed temperature value, a sensed humidity value and a sensed carbon dioxide value. The control unit 40 receives the set values from the setting unit 20 and the sensed values from the detecting unit 30 to compare the sensed values with the set values and to send a control signal to control a cross-sectional area A of the air outlet 60.

Figure 4:
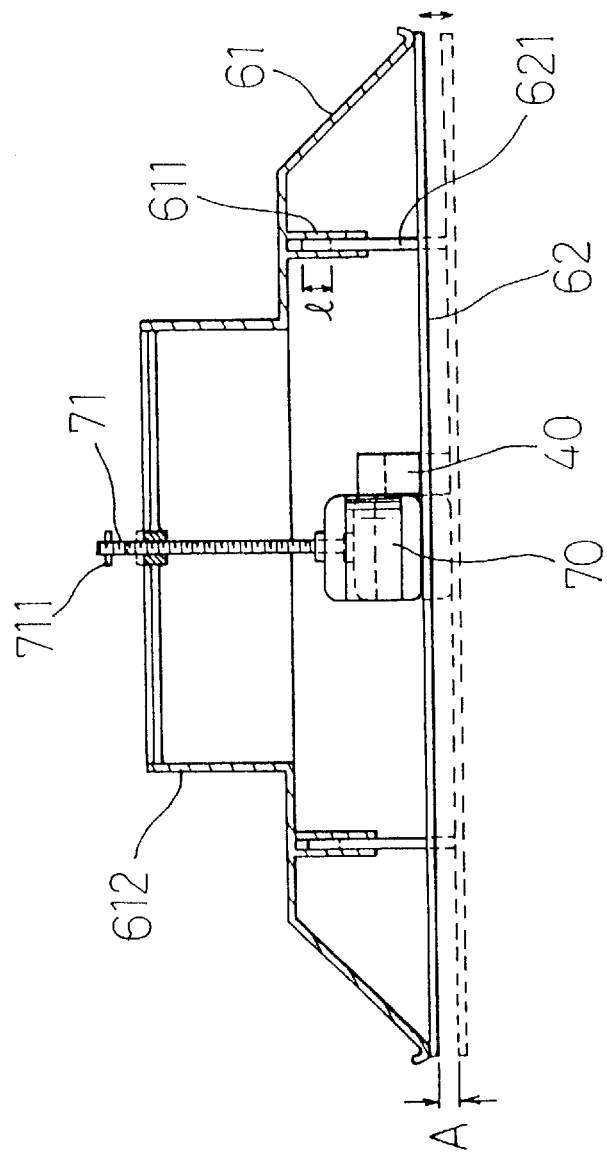
FIG. 4 is a sectional view of an air outlet control device of a first preferred embodiment in accordance with the present invention.

The cross-sectional area A is formed between the guide plate 62 and the box 61 (as shown in FIG. 4). X represents a set difference value. TA represents a sensed room temperature value. TAS represents a set temperature value.

Block 41 represents controlling the cross-sectional area A of the air outlet 60.

If TA is larger than TS plus X, the cross-sectional area A is enlarged to the utmost. A wire is connected to the control unit 40 and the main motor 70. The control unit 40 controls the main motor 70 to rotate in order to move the screw rod 71 downward so that the cross-sectional area A is enlarged.

If TA is less than TS plus X, the cross-sectional area A is decreased to the utmost. The control unit 40 controls the main motor 70 to rotate in order to move the screw rod 71 upward so that the cross-sectional area A is decreased.

Block 42 represents maintaining an excellent air condition in the room.

Figure 5:
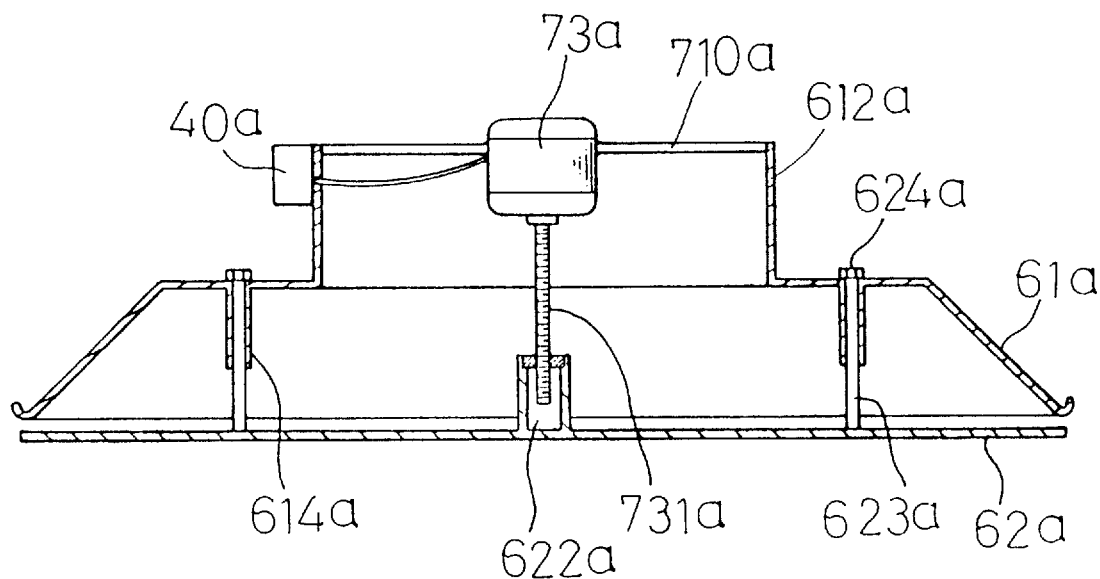
FIG. 5 is a sectional view of an air outlet control device of a second preferred embodiment in accordance with the present invention.
Figure 6:
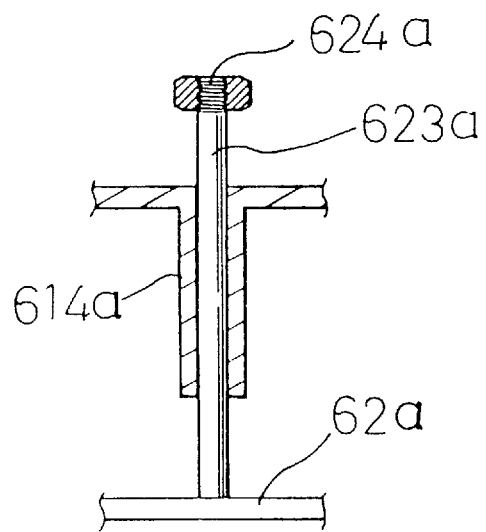
FIG. 6 is a sectional view of a pin and a sleeve of a second preferred embodiment in accordance with the present invention.

Referring to FIGS. 5 and 6, a second air outlet control device comprises a box 61a disposed on an air outlet (not shown in the figures), a plurality of sleeves 614a disposed on the box 61a, a vent ring 612a disposed on the box 61a, a plurality of bars 710a disposed in the vent ring 612a to position a main motor 73a, a screw rod 731a connected to the main motor 73a, a cylinder seat 622a disposed on a guide plate 62a, a control unit 40a disposed on the vent ring 612a, a wire connected to the control unit 40a and the main motor 73a, the screw rod 731a inserted in the cylinder seat 622a, and a plurality of positioning pins 623a disposed on the guide plate 62a and inserted in the sleeves 614a. Each distal end of the positioning pin 623a engages with a nut 624a.

Figure 7:
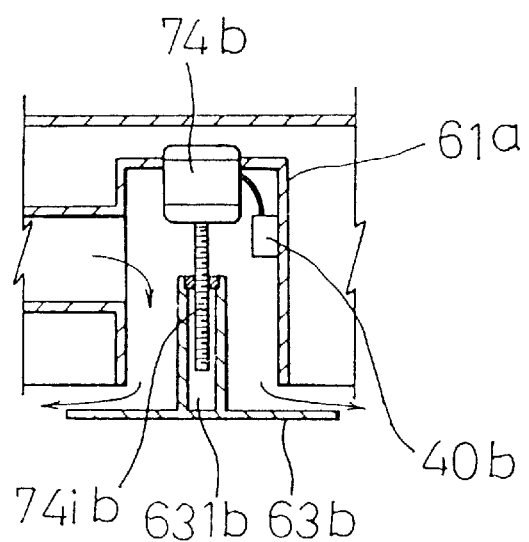
FIG. 7 is a sectional view of an air outlet control device of a third preferred embodiment in accordance with the present invention.

Referring to FIG. 7, a third air outlet control device comprises a box 61b disposed on an air outlet (not shown in the figures), a main motor 73b disposed in the box 61b, a screw rod 741b connected to the main motor 73b, a cylinder seat 631b disposed on a guide plate 63b, a control unit 40b disposed in the box 61b, a wire connected to the control unit 40b and the main motor 73b, and the screw rod 741b inserted in the cylinder seat 631b.

Figure 8:
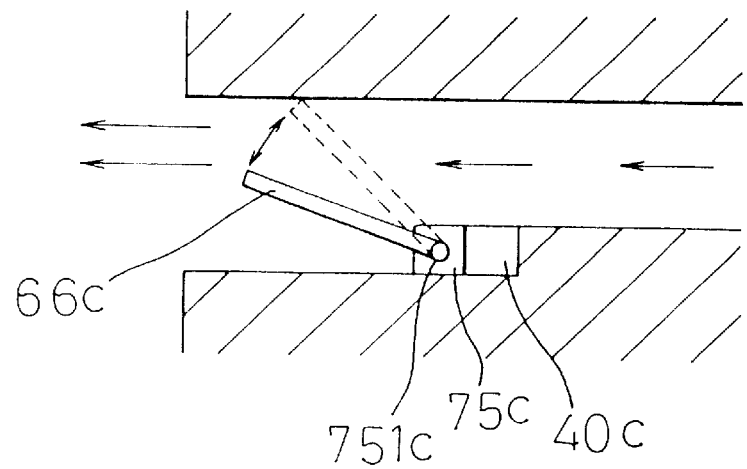
FIG. 8 is a sectional view of an air outlet control device of a fourth preferred embodiment in accordance with the present invention.

Referring to FIG. 8, a fourth air outlet control device comprises an air outlet, a main motor 75c and a control unit 40c disposed in the air outlet, a shaft 751c connected to a block plate 66c and the main motor 75c.

Figure 9:
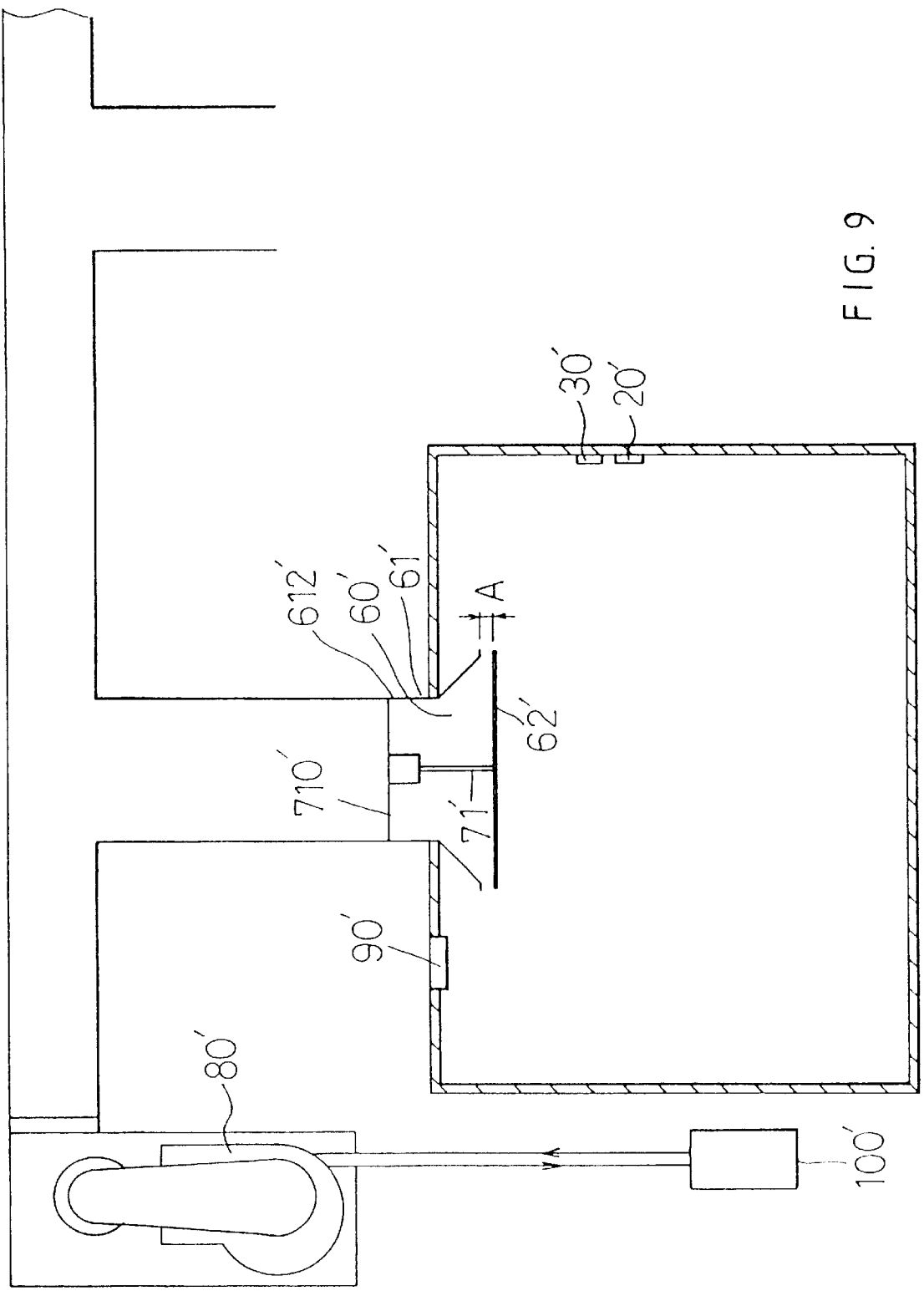
FIG. 9 is a schematic view illustrating an air condition system of a fifth preferred embodiment in accordance with the present invention.
Figure 10:
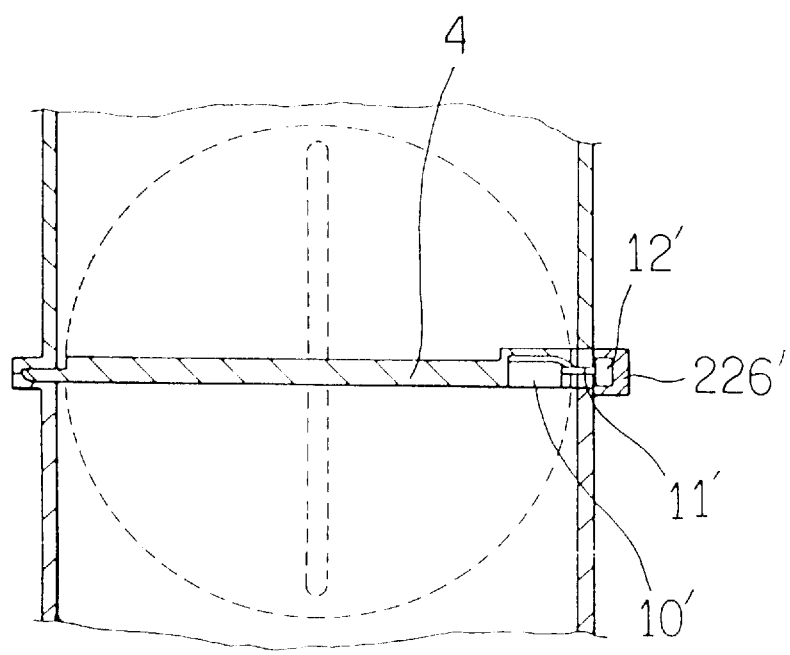
FIG. 10 is a block diagram illustrating an operation of a fifth preferred embodiment in accordance with the present invention.

Referring to FIGS. 9 and 10, a second air condition system comprises a fifth air outlet control device, an ice machine 100', and a vent hole 90'. The fifth air outlet control device comprises a fan motor 80', a setting unit 20', a detecting unit 30', an air outlet 60', a box 61' disposed on the air outlet 60', a vent ring 612' disposed on the box 61', a plurality of bars 710' disposed in the vent ring 612' to position a cylinder seat (not shown in the figures), a screw rod 71' inserted in the cylinder seat, and the rest of elements are the same as those in the first preferred embodiment.

The setting unit 20' determines a set temperature value, a set humidity value and a set carbon dioxide value. The detecting unit 30' has a plurality of sensors to detect a sensed temperature value, a sensed humidity value and a sensed carbon dioxide value. The control unit 40' receives the set values from the setting unit 20' and the sensed values from the detecting unit 30' to compare the sensed values with the set values and to send a control signal to control a cross-sectional area A of the air outlet 60'.

The cross-sectional area A is formed between the guide plate 62' and the box 61' (as shown in FIG. 9). X represents a set difference value. TA represents a sensed room temperature value. TAS represents a set temperature value.

Block 41' represents controlling the cross-sectional area A of the air outlet 60'.

Block 42' represents controlling the rotating speed of the fan motor 80'.

If TA is larger than TS plus X, the cross-sectional area A is enlarged to the utmost. A wire is connected to the control unit 40' and the main motor. The control unit 40' controls the fan motor 80' and the main motor to rotate in order to move the screw rod 71' downward so that the cross-sectional area A is enlarged.

If TA is less than TS plus X, the cross-sectional area A is decreased to the utmost. The control unit 40' controls the fan motor 80' and the main motor to rotate in order to move the screw rod 71' upward so that the cross-sectional area A is decreased.

Block 43' represents maintaining an excellent air condition in the room.

The invention is not limited to the above embodiment but various modification thereof may be made. Further, various changes in form and detail may be made without departing from the scope of the invention.

I claim:

1. An air outlet control device comprises:

a setting unit, a detecting unit, an air outlet, and a control unit, the setting unit determining a set temperature value, a set humidity value and a set carbon dioxide value, the detecting unit having a plurality of sensors to detect a sensed temperature value, a sensed humidity value and a sensed carbon dioxide value, the control unit receiving the set values from the setting unit and the sensed values from the detecting unit to compare the sensed values with the set values and to send a control signal to control a cross-sectional area of the air outlet, and wherein the air outlet control device further comprises a box disposed on an air outlet, a plurality of sleeves disposed on the box, a vent ring disposed on the box, a plurality of bars disposed in the vent ring to position a cylinder seat, a screw rod inserted in the cylinder seat, a main motor disposed on a guide plate and connected to the screw rod, the control unit disposed on the main motor, and a plurality of positioning pins disposed on the guide plate and inserted in the sleeves.

2. An air outlet control device as claimed in claim 1, wherein the air outlet control device further comprises a box disposed on an air outlet, a plurality of sleeves disposed on the box, a vent ring disposed on the box, a plurality of bars disposed in the vent ring to position a main motor, a screw rod connected to the main motor, a cylinder seat disposed on a guide plate, a control unit disposed on the vent ring, a wire connected to the control unit and the main motor, the screw rod inserted in the cylinder seat, and a plurality of positioning pins disposed on the guide plate and inserted in the sleeves.

3. An air outlet control device as claimed in claim 1, wherein the air outlet control device further comprises a box disposed on an air outlet, a main motor disposed in the box, a screw rod connected to the main motor, a cylinder seat disposed on a guide plate, a control unit disposed in the box, a wire connected to the control unit and the main motor, and the screw rod inserted in the cylinder seat.

4. An air outlet control device as claimed in claim 1, wherein the air outlet control device further comprises a main motor and a control unit disposed in the air outlet, and a shaft connected to a block plate and the main motor.

* * * * *